(12) United States Patent
Schmidhammer

(10) Patent No.: US 8,305,136 B2
(45) Date of Patent: Nov. 6, 2012

(54) SWITCHABLE CAPACITIVE ELEMENT WITH IMPROVED QUALITY FACTOR, AND METHOD OF PRODUCTION

(75) Inventor: Edgar Schmidhammer, Stein an der Traun (DE)

(73) Assignee: Epcos AG, Munich (DE)

( * ) Notice: Subject to any disclaimer, the term of this patent is extended or adjusted under 35 U.S.C. 154(b) by 121 days.

(21) Appl. No.: 13/017,159

(22) Filed: Jan. 31, 2011

(65) Prior Publication Data
US 2011/0187434 A1    Aug. 4, 2011

(30) Foreign Application Priority Data
Feb. 1, 2010   (DE) .......................... 10 2010 006 438

(51) Int. Cl.
*H03B 1/00*    (2006.01)

(52) U.S. Cl. .......................... 327/554; 327/337; 341/150
(58) Field of Classification Search .................. 327/552, 327/554, 337; 341/150, 172
See application file for complete search history.

(56) References Cited

U.S. PATENT DOCUMENTS

| | | | | |
|---|---|---|---|---|
| 4,322,697 A | * | 3/1982 | Carbrey | 333/173 |
| 5,534,819 A | * | 7/1996 | Gunter et al. | 327/553 |
| 6,288,669 B1 | * | 9/2001 | Gata | 341/172 |

FOREIGN PATENT DOCUMENTS

WO    2009/108391 A1    9/2009

\* cited by examiner

*Primary Examiner* — An Luu
(74) *Attorney, Agent, or Firm* — Nixon Peabody LLP

(57) ABSTRACT

A switchable capacitive element having an adjustable capacitance and an improved quality factor is specified. To this end, the characteristic variables of the switchable capacitive element are optimized in accordance with the equations cited in the description.

14 Claims, 2 Drawing Sheets

SWITCHABLE CAPACITIVE ELEMENT WITH IMPROVED QUALITY FACTOR, AND METHOD OF PRODUCTION

CROSS-REFERENCE TO RELATED APPLICATION

This application claims the benefit under 35 U.S.C. §119 of Germany Patent Application Serial No. 10 2010 006 438.6, filed in Germany on Feb. 1, 2010, entitled "Switchable Capacitive Element with Improved Quality Factor, and Method of Production."

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The invention relates to switchable capacitive elements, e.g. DTC (Digitally Tunable Capacitor), which have an improved quality factor and which can be used in RF signal paths, for example.

BACKGROUND

Switchable capacitive elements (e.g. DTCs) may be designed as capacitor banks having parallel-connected capacitors. Individual capacitors can then be connected to the bank or isolated from the bank by means of switches. The total capacitance of such a capacitor bank is calculated essentially from the sum of the connected individual capacitors.

By way of example, such capacitor banks are used as capacitive elements of variable capacitance in impedance matching circuits in signal paths for mobile communication appliances.

A variable which characterizes a capacitor bank is the quality factor $Q(\omega)$, which is a measure of the resonant response in an AC circuit or in an RF signal line. When a capacitor bank is connected in an RF signal line, it is of great significance whether the quality factor of the bank or of the switchable capacitive element is in tune with the quality factors of the remaining RF circuit components connected thereto. Remaining circuit components may be RF filters in a front-end circuit or the antenna of a mobile communication appliance, for example.

DTCs are known from the publication WO 2009/108391. A DTC comprises a plurality of parallel paths having capacitors connected therein. The capacitances of the individual capacitors of the parallel-connected paths correspond to the powers of two of a very small capacitance. It is thus possible for $2^n$ equidistant capacitances to be adjusted for n parallel-connected paths. Each parallel path of a DTC comprises a cascade of serially-connected semiconductor switches, which is connected in series with the capacitor. The cascade can be used to connect or isolate the capacitor of the parallel path to or from an RF signal line. WO 2009/108391 specifies rules (cf. equations 5A, 5B, 6A and 6B) for calculating the quality factor of a DTC or a parallel path on the basis of characteristic variables of the capacitors of the parallel paths and of the semiconductor switches. In this case, a distinction is drawn between open and closed semiconductor switches.

It is an object of the present invention to specify a circuit which has an improved quality factor in comparison with previously known circuits. In particular, it is an object of the invention to specify a switchable capacitive element which has an improved quality factor and which is not reliant on the use of variables for the capacitors which are based on powers of two.

The invention achieves these objects by means of switchable capacitive elements and by means of a switchable capacitance bank according to one of the independent claims. Advantageous embodiments and a method of production can be found in further claims.

One embodiment of a switchable capacitive element having an adjustable capacitance and an improved quality factor comprises n parallel-connected paths with a respective capacitor of capacitance C or $2^m*C$, wherein m is an integer $\geq 0$ and less than n. Per path, the switchable capacitive element comprises n semiconductor switches, cascaded in the path, with a respective source connection, gate connection and a drain connection. The switchable capacitive element has a frequency-dependent quality factor $Q^S_{on}(\omega)$ when the semiconductor switches are open and has a frequency-dependent quality factor $Q^S_{off}(\omega)$ when the semiconductor switches are closed. $R_G$ is the nonreactive resistance of an external resistive element (i.e., external to the switchable capacitive element) connected to the gate connection, $R_{GS}$ is the nonreactive resistance between the gate connection and the source connection, $R_{GD}$ is the nonreactive resistance between the gate connection and the drain connection, $R_{ON}$ is the nonreactive resistance between the drain connection and the source connection, if the semiconductor switch is closed. $R_D$ is the nonreactive resistance of an external, i.e. one that is not associated with the switch, resistive element connected between the drain connection and the source connection. $r_{DS}$ is the intrinsic nonreactive resistance of the switch between the drain connection and the source connection. $C_{GD}$ is the capacitance between the gate connection and the drain connection. $C_{GS}$ is the capacitance between the gate connection and the source connection. $C_{DS}$ is the capacitance between the drain connection and the source connection. $R_{MIM}$ is the (finite) nonreactive resistance of the capacitor. $R_{MIM}$ can be used to model the quality of the capacitor. The values C, $R_{MIM}$, $R_{on}$, $R_G$, $R_{GS}$, $R_{GD}$, $R_D$, $r_{DS}$, $C_{GD}$, $C_{GS}$, $C_{DS}$ are in this case optimized according to the equation $$Q^S_{ON} = \frac{1}{\omega \cdot \left(R_{MIM} + \frac{n \cdot R_{ON} R_a}{n \cdot R_{ON} + R_a}\right) \cdot C} \quad \text{(Equation 1)}$$

when the semiconductor switches are open and according to the equation $$Q^S_{OFF} = \frac{1}{\omega \cdot \left(R_{MIM} + nR_d + \frac{n}{\omega^2 C_d^2 R_e} + \frac{n^3}{\omega^2 C_d^2 R_a}\right) \cdot \frac{C_d C}{C_d + nC}} \quad \text{(Equation 2)}$$

when the semiconductors are closed. In this case, the auxiliary variables $R_a$, $R_b$, $R_d$, $C_d$, $R_e$, $R_c$ and $C_c$ cited in the Equations 1-6 (Equations 3-6 are set forth below) are calculated from the values C, $R_{MIM}$, $R_{on}$, $R_G$, $R_{GS}$, $R_{GD}$, $R_D$, $r_{DS}$, $C_{GD}$, $C_{GS}$, $C_{DS}$ as follows:

(Equation Set 1)

$$R_a = R_G \cdot \frac{C_{GD} + C_{GS}}{C_{GD}}$$

$$R_b = R_G \cdot \frac{C_{GD} + C_{GS}}{C_{GS}}$$

$$R_d = \frac{R_c}{\left(1 + \frac{C_{DS}}{C_c}\right)^2}$$

$$C_d = C_{DS} + C_c$$

$$R_e = \frac{r_{DS} R_D}{r_{DS} + R_D}$$

$$R_c = \frac{R_{GD}}{1 + (\omega R_{GD} C_{GD})^2} + \frac{R_{GS}}{1 + (\omega R_{GS} C_{GS})^2} - \frac{1}{\omega^2 R_G C_{GD} C_{GS}}$$

$$C_c = \frac{C_{GD} C_{GS}}{C_{GD} + C_{GS}}.$$

In this case, n is a natural number $\geq 1$.

The indication of this dependency of the quality factor Q on the variables which characterize the switchable capacitive element provides a simple means for selecting the variables C, $R_{MIM}$, $R_{ON}$, $R_G$, $R_{GS}$, $R_{GD}$, $R_D$, $r_{DS}$, $C_{GD}$, $C_{GS}$ and $C_{DS}$ such that a suitable quality factor is obtained which can be prescribed from a specification that is to be observed, for example. To this end, the optimum for the quality factor Q can be ascertained particularly by means of Monte Carlo simulations or by means of analytical or numerical calculations of the partial derivations of Q on the basis of the parameters C, $R_{MIM}$, $R_{ON}$, $R_G$, $R_{GS}$, $R_{GD}$, $R_D$, $r_{DS}$, $C_{GD}$, $C_{GS}$ and $C_{DS}$ that are to be varied.

In one embodiment, the cascade of the semiconductor switches in each path is connected between the capacitor of the path and ground.

An alternative variant of the switchable capacitive element comprises n parallel-connected paths with a respective capacitor of capacitance C or $2^m*C$, wherein m is an integer $\geq 0$ and less than n, and per path n semiconductor switches, cascaded in the path, with a respective source connection, gate connection and drain connection. The switchable capacitive element has a frequency-dependent quality factor $Q^D_{on}(\omega)$ when the semiconductor switches are open and has a frequency-dependent quality factor $Q^D_{off}(\omega)$ when the semiconductor switches are closed. $R_G$ is the nonreactive resistance of a resistive element connected to the gate connection, $R_{GS}$ is the nonreactive resistance between the gate connection and the source connection, $R_{GD}$ is the nonreactive resistance between the gate connection and the drain connection, $R_D$ is the nonreactive resistance of an external resistive element connected between the drain connection and the source connection, $r_{DS}$ is the nonreactive resistance between the drain connection and the source connection. $C_{GD}$ is the capacitance between the gate connection and the drain connection; $C_{GS}$ is the capacitance between the gate connection and the source connection; $C_{DS}$ is the capacitance between the drain connection and the source connection. The values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q^D_{ON} = \frac{1}{\omega \cdot \left(R_{MIM} + nR_{ON} + \frac{n}{\omega^2 C^2 R_a} + \frac{n}{\omega^2 C^2_{MIM} R_b}\right) \cdot C} \quad \text{(Equation 3)}$$

when the semiconductor switches are open and according to the equation $$Q^D_{OFF} = \frac{1}{\omega \cdot \left(R_{MIM} + nR_d + \frac{n}{\omega^2 C_d^2 R_e} + \frac{n}{\omega^2 C^2 R_a} + \frac{n}{\omega^2 \left(\frac{CC_d}{nC + C_d}\right)^2 R_b}\right) \cdot \frac{CC_d}{nC + C_d}} \quad \text{(Equation 4)}$$

when the semiconductor switches are closed. n is a natural number $\geq 1$. The auxiliary variables $R_a$, $R_b$, $R_d$, $R_e$, and $C_d$ are calculated from the values C, $R_{MIM}$, $R_{on}$, $R_G$, $R_{GS}$, $R_{GD}$, $R_D$, $r_{DS}$, $C_{GD}$, $C_{GS}$, $C_{DS}$ as set forth above in Equation Set 1.

In one embodiment of this variant, the capacitor of each path is connected between the cascade of the semiconductor switches and ground.

The embodiments cited above are thus distinguished in that in one case the cascade of the semiconductor switches is connected to ground and that in the other case the capacitor is connected to ground. It is preferred if the cascade of the semiconductor switches is connected between the capacitor of a path and ground.

A further alternative embodiment of the invention relates to a switchable capacitance bank having m switchable capacitive elements. Each of the switchable capacitive elements comprises n parallel-connected paths with a respective capacitor of capacitance $a^m*C$ and per path n semiconductor switches, cascaded in the path, with a respective source connection, gate connection and drain connection. In this case, a is a real number >1. Each path comprises n semiconductor switches, cascaded in the path, with a respective source connection, gate connection and drain connection. In this case, the capacitors of each path are connected between the cascade of the semiconductor switches and ground. The switchable capacitive element has a frequency-dependent quality factor $Q_{on}(\omega)$ when the semiconductor switches are open and has a frequency-dependent quality factor $Q_{off}(\omega)$ when the semiconductor switches are closed. $R_G$ is the nonreactive resistance of a resistive element connected to the gate connection, $R_{GS}$ is the nonreactive resistance between the gate connection and the source connection, $R_{GD}$ is the nonreactive resistance between the gate connection and the drain connection, $R_D$ is the nonreactive resistance of an external resistive element connected between the drain connection and the source connection, $r_{DS}$ is the nonreactive resistance of the switch between the drain connection and the source connection. $C_{GD}$ is the capacitance between the gate connection and the drain connection, $C_{GS}$ is the capacitance between the gate connection and the source connection, $C_{DS}$ is the capacitance between the drain connection and the source connection. In this case, the values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q_{ON} = \frac{1}{\omega \cdot \left(\frac{1}{a} R_{MIM} + \frac{n \cdot \frac{1}{a} R_{ON} \cdot \frac{1}{a} \cdot R_a}{n \cdot \frac{1}{a} R_{ON} + \frac{1}{a} R_a}\right) \cdot a \cdot C} \quad \text{(Equation 5)}$$

when the semiconductor switches are open and according to the equation $$Q_{OFF} = \cfrac{1}{\omega \cdot \left(\cfrac{1}{a}R_{MIM} + n\cfrac{1}{a}R_d + \cfrac{n}{\omega^2 a^2 C_d^2 \cfrac{1}{a} R_e} + \cfrac{n^3}{\omega^2 a^2 C_d^2 \cfrac{1}{a} R_a}\right)} \cdot \cfrac{aC_d \cdot a \cdot C}{aC_d + n \cdot a^2 C}$$

(Equation 6)

when the semiconductor switches are closed. n and m are integers $\geq 0$. n is $\geq 1$. In this case, the auxiliary variables $R_a$, $R_d$, $R_e$, and $C_d$ cited in the Equations 5-6 are calculated from the values C, $R_{MIM}$, $R_{on}$, $R_G$, $R_{GS}$, $R_{GD}$, $R_D$, $r_{DS}$, $C_{GD}$, $C_{GS}$, $C_{DS}$ as set forth in Equation Set 1 above.

In one embodiment, the values C, $R_{MIM}$, $R_{ON}$, $R_G$, $R_{GS}$, $R_{GD}$, $R_D$, $r_{DS}$, $C_{GD}$, $C_{GS}$ and $C_{DS}$ are chosen such that the ratio comprising the quality factor Q and the sum of the intrinsic capacitances $C_{GD}$, $C_{GS}$ and $C_{DS}$, namely $$\frac{Q}{C_{GD} + C_{GS} + C_{DS}},$$

is at a maximum. In that case, the switchable capacitive element has a minimized surface area requirement.

The switchable capacitive element may be part of a filter circuit.

Methods according to the invention for producing adjustable capacitive elements or capacitance banks comprise the following:

a target quality factor for the element or for the bank is ascertained or prescribed, the magnitude of the capacitances of the capacitors of the paths is ascertained, the values of the variables C, $R_{MIM}$, $R_{ON}$, $R_G$, $R_{GS}$, $R_{GD}$, $R_D$, $r_{DS}$, $C_{GD}$, $C_{GS}$ and $C_{DS}$ are ascertained according to the aforementioned equations. For example, the target quality factor can be optimized according to a function that includes a resistance $R_a$ whose value is calculated from a nonreactive resistance $R_G$ of an external resistive element connected to the gate connection (G), a gate-drain capacitance $C_{GD}$ between the gate connection and the drain connection, and a gate-source capacitance $C_{GS}$ between the gate connection and the source connection.

Optionally, a method comprises the readjustment of the magnitude of the capacitances of the capacitors in the paths, and the implementation of the adjustable capacitive elements or capacitance banks by proportioning the parameters in accordance with the ascertained values.

BRIEF DESCRIPTION OF THE DRAWINGS

The text below provides a more detailed explanation of the capacitive element with reference to exemplary embodiments and associated schematic figures, in which.

DETAILED DESCRIPTION

Figures 1, 2, 3, 4:
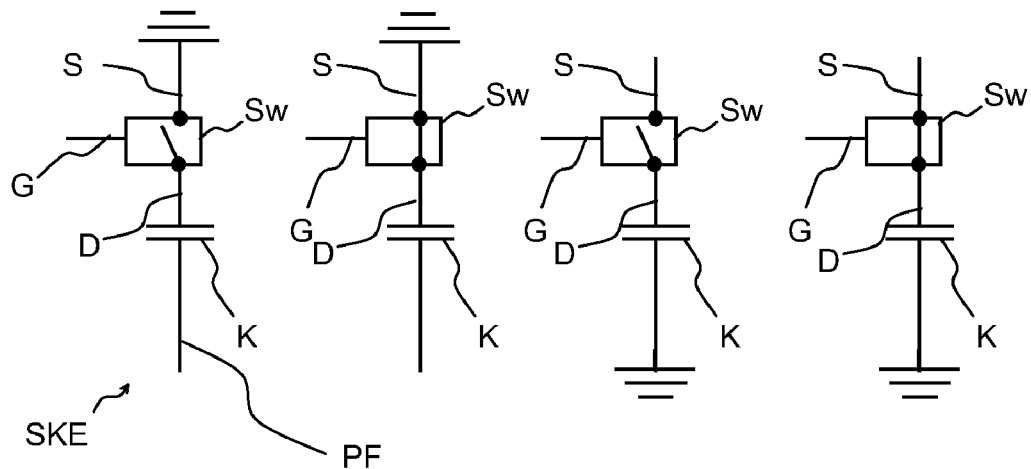
FIG. 1 shows a switchable capacitive element with an open switch which is connected between ground and the capacitor.
FIG. 2 shows a switchable capacitive element with a closed switch which is connected between ground and the capacitor.
FIG. 3 shows a switchable capacitive element with a capacitor which is connected between an open switch and ground.
FIG. 4 shows a switchable capacitive element with a capacitor which is connected between a closed switch and ground.

FIG. 1 shows a switchable capacitive element SKE in which a capacitor K and a switch SW are connected. The switch SW is connected in series with the capacitor K. The switch SW has a source connection S, a gate connection G and a drain connection D. The switch SW is connected to ground via a source connection S. The switching state of the switch SW is dependent on the signal which is applied to the gate connection G. Depending on the signal applied to the gate connection G, the switch may thus be open or closed. If the switch SW is closed, its capacitor K is connected to ground via the switch SW.

FIG. 2 differs from FIG. 1 in that the switch SW is closed. In FIG. 2, the capacitor K is connected to ground via the switch SW.

FIG. 3 shows a switchable capacitive element with a switch SW and a capacitor K. The switch SW and the capacitor K are connected in series. The capacitor K is connected directly to ground. In FIG. 3, the switch SW is open. If the switchable capacitive element is connected to a signal path (not shown) via the source connection S of the switch SW then the capacitor K does not provide a ground connection between the signal path and ground.

FIG. 4 differs from FIG. 3 in that the switch SW is closed. A signal path which would be connected to the switchable capacitive element via the source connection of the switch SW would be connected to ground via the capacitor K.

Figure 5:
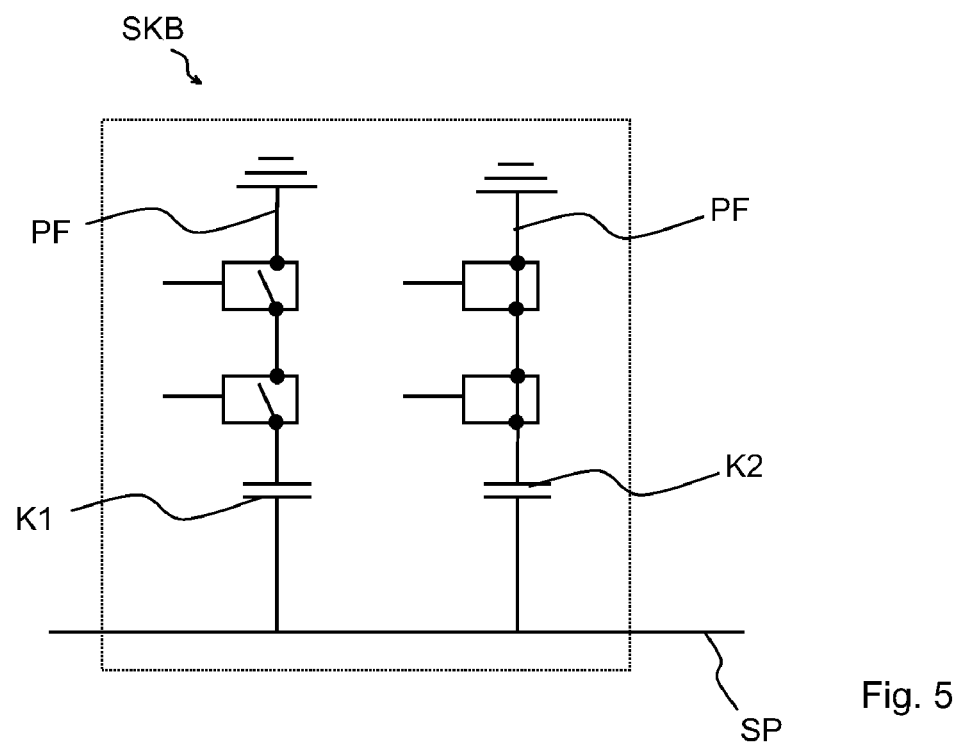
FIG. 5 shows a switchable capacitive element with two parallel-connected paths with two serially cascaded switches.

FIG. 5 shows a switchable capacitive element SKE which is connected to a signal path SP. The switchable capacitive element comprises two parallel-connected paths PF. In each of the parallel-connected paths, a capacitor K is connected. The switches of the path in which the capacitor K1 is connected are open. The capacitor K1 is therefore not connected to ground.

The switches of the parallel path in which the capacitor K2 is connected are closed. The signal path SP is therefore connected to ground via the capacitor K2 and the switches of the relevant parallel path.

FIG. 5 shows a embodiment of a switchable capacitance bank SKB which can be expanded to a larger number of parallel paths with a large number of switches. In particular, it is possible to provide three, four, five, six, seven, eight, nine, ten or even more parallel paths having a corresponding number of switches in the switchable capacitive element. The capacitances of the individual capacitors K1, K2 of the parallel paths PF can correspond to the powers of 2 ($2^i$) of a fundamental capacitance. With n parallel paths having n capacitors, it would therefore be possible to adjust $2^n$ equidistantly adjustable total capacitances using the switchable capacitive element.

It is also possible for the capacitance of the capacitors not to be configured in accordance with powers of 2 ($2^i$). The capacitance of the capacitor of the m-th parallel path could have the capacitance $a^m$. m is a number $\geq 0$ but $<n$. In this case, n is the number of parallel paths. a is the capacitance of the capacitor with the lowest capacitance. If a differs from 2, no equidistant adjustment options are obtained. On the other hand, the coverage of the capacitance of the switchable capacitive element increases if a>2.

Figure 6:
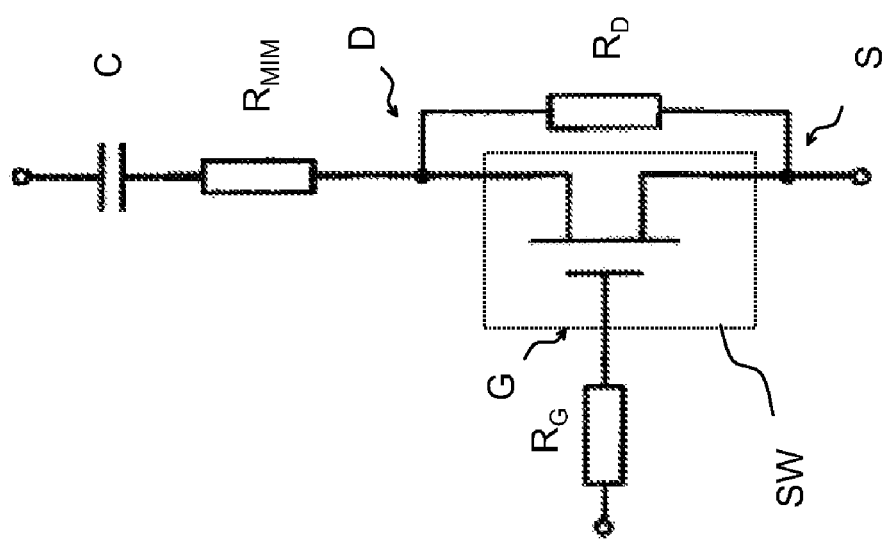
FIG. 6 shows a circuit with a conventional view of a semiconductor switch.

FIG. 6 shows a circuit with a conventional view of a semiconductor switch SW. The drain connection has a capacitor of capacitance C connected to it. The capacitor and the switch SW have a resistive element K (shown in FIG. 1) with a nonreactive resistance $R_{MIM}$ connected between them.

Figure 7:
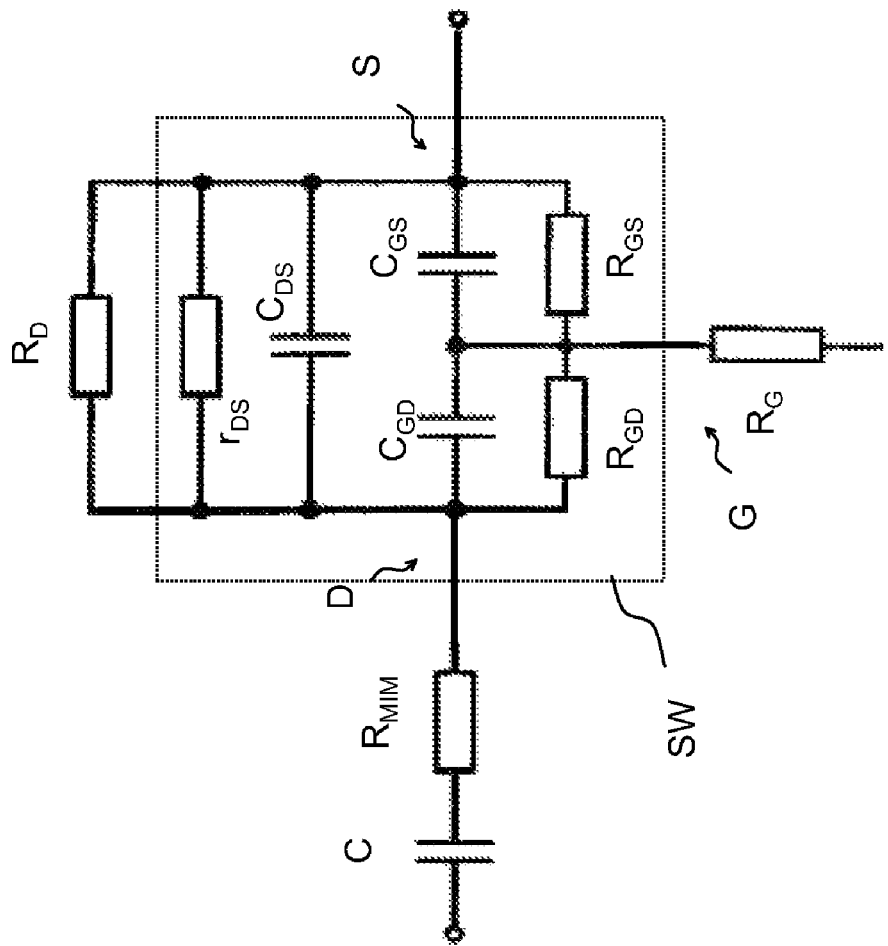
FIG. 7 shows the circuit from FIG. 6, but with the equivalent circuit diagram of the semiconductor switch on which the present invention is based.

FIG. 7 shows the equivalent circuit diagram of the semiconductor switch SW. This diagram comprises the resistive elements with the nonreactive resistances $r_{DS}$, $R_{GD}$ and $R_{GS}$ and also the capacitive elements of capacitance $C_{DS}$, $C_{GD}$ and $R_{GS}$.

A switchable capacitive element or a switchable capacitance bank is not limited to one of the exemplary embodiments described. Variations which, by way of example, comprise yet further parallel paths or further capacitors in parallel paths or further switches or which comprise any combinations thereof are likewise inventive exemplary embodiments.

LIST OF REFERENCE SYMBOLS

S: Source connection
G: Gate connection
D: Drain connection
K, K1, K2: Capacitor
SKB: Switchable capacitance bank
SKE: Switchable capacitive element
PF: Parallel path
SP: Signal path

What is claimed is:

1. A switchable capacitive element (SKE), comprising n parallel-connected paths (PF) with a respective capacitor (K) of capacitance C, per path n semiconductor switches (SW), cascaded in the path, with a respective source connection (S), gate connection (G) and drain connection (D), wherein the switchable capacitive element (SKE) has a frequency-dependent quality factor $Q^S_{on}(\omega)$ when the semiconductor switches (SW) are open and has a frequency-dependent quality factor $Q^S_{off}(\omega)$ when the semiconductor switches (SW) are closed, $R_G$ is the nonreactive resistance of a resistive element connected to the gate connection, $R_{GS}$ is the nonreactive resistance between the gate connection (G) and the source connection (S), $R_{GD}$ is the nonreactive resistance between the gate connection (G) and the drain connection (D), $R_D$ is the nonreactive resistance of a capacitive element connected between the drain connection (D) and the source connection (S), $r_{DS}$ is the nonreactive resistance between the drain connection (D) and the source connection (S), $C_{GD}$ is the capacitance between the gate connection (G) and the drain connection (D), $C_{GS}$ is the capacitance between the gate connection (G) and the source connection (S), $C_{DS}$ is the capacitance between the drain connection (D) and the source connection (S), wherein the values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q^S_{ON} = \frac{1}{\omega \cdot \left(R_{MIM} + \frac{n \cdot R_{ON} R_a}{n \cdot R_{ON} + R_a}\right) \cdot C}$$

when the semiconductor switches (SW) are open and according to the equation $$Q^S_{OFF} = \frac{1}{\omega \cdot \left(R_{MIM} + nR_d + \frac{n}{\omega^2 C_d^2 R_e} + \frac{n^3}{\omega^2 C_d^2 R_a}\right) \cdot \frac{C_d C}{C_d + nC}}$$

when the semiconductor switches (SW) are closed, wherein $$R_a = R_G \cdot \frac{C_{GD} + C_{GS}}{C_{GD}}$$

$$R_d = \frac{R_c}{\left(1 + \frac{C_{DS}}{C_c}\right)^2}$$

$$C_d = C_{DS} + C_c$$

$$R_e = \frac{r_{DS} R_D}{r_{DS} + R_D}$$

$$R_c = \frac{R_{GD}}{1 + (\omega R_{GD} C_{GD})^2} + \frac{R_{GS}}{1 + (\omega R_{GS} C_{GS})^2} - \frac{1}{\omega^2 R_G C_{GD} C_{GS}}$$

$$C_c = \frac{C_{GD} C_{GS}}{C_{GD} + C_{GS}}$$

and n is a natural number $\geq 1$.

2. The switchable capacitive element (SKE) according to claim 1, wherein the cascade of the semiconductor switches (SW) in each path (PF) is connected between the capacitor (K) of the path (PF) and ground.

3. The switchable capacitive element (SKE) according to claim 1, wherein the values C, $R_{MIM}$, $R_{ON}$, $R_G$, $R_{GS}$, $R_{GD}$, $R_D$, $r_{DS}$, $C_{GD}$, $C_{GS}$ and $C_{DS}$ are chosen such that the ratio $$\frac{Q}{C_{GD} + C_{GS} + C_{DS}}$$

comprising the quality factor Q and the sum of the intrinsic capacitances $C_{GD}$, $C_{GS}$ and $C_{DS}$ is at a maximum.

4. A switchable capacitive element, comprising n parallel-connected paths (PF) with a respective capacitor (K) of capacitance C, per path (PF) n semiconductor switches (SW), cascaded in the path (PF), with a respective source connection (S), gate connection (G) and drain connection (D), wherein the switchable capacitive element (SKE) has a frequency-dependent quality factor $Q^P_{on}(\omega)$ when the semiconductor switches (SW) are open and has a frequency-dependent quality factor $Q^P_{off}(\omega)$ when the semiconductor switches (SW) are closed, $R_G$ is the nonreactive resistance of a resistive element connected to the gate connection (G), $R_{GS}$ is the nonreactive resistance between the gate connection (G) and the source connection (S), $R_{GD}$ is the nonreactive resistance between the gate connection (G) and the drain connection (D), $R_D$ is the nonreactive resistance of a resistive element connected between the drain connection (D) and the source connection (S), $r_{DS}$ is the nonreactive resistance of the switch between the drain connection (D) and the source connection (S), $C_{GD}$ is the capacitance between the gate connection (G) and the drain connection (D), $C_{GS}$ is the capacitance between the gate connection (G) and the source connection (S), $C_{DS}$ is the capacitance between the drain connection (D) and the source connection (S), wherein the values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q_{ON}^D = \frac{1}{\omega \cdot \left(R_{MIM} + nR_{ON} + \frac{n}{\omega^2 C^2 R_a} + \frac{n}{\omega^2 C^2 R_b}\right) \cdot C}$$

when the semiconductor switches (SW) are open and according to the equation $$Q_{OFF}^D = \frac{1}{\omega \cdot \left(\frac{R_{MIM} + nR_d + \frac{n}{\omega^2 C_d^2 R_e} + \frac{n}{\omega^2 C^2 R_a} +}{\frac{n}{\omega^2 \left(\frac{CC_d}{nC+C_d}\right)^2 R_b}}\right) \cdot \frac{CC_d}{nC+C_d}}$$

when the semiconductor switches (SW) are closed, wherein $$R_a = R_G \cdot \frac{C_{GD} + C_{GS}}{C_{GD}}$$

$$R_b = R_G \cdot \frac{C_{GD} + C_{GS}}{C_{GS}}$$

$$R_d = \frac{R_c}{\left(1 + \frac{C_{DS}}{C_c}\right)^2}$$

$$C_d = C_{DS} + C_c$$

$$R_e = \frac{r_{DS} R_D}{r_{DS} + R_D}$$

$$R_c = \frac{R_{GD}}{1 + (\omega R_{GD} C_{GD})^2} + \frac{R_{GS}}{1 + (\omega R_{GS} C_{GS})^2} - \frac{1}{\omega^2 R_G C_{GD} C_{GS}}$$

$$C_c = \frac{C_{GD} C_{GS}}{C_{GD} + C_{GS}}$$

and n is a natural number $\geq 1$.

5. The switchable capacitive element (SKE) according to claim 4, wherein the capacitor (K) of each path (PF) is connected between the cascade of the semiconductor switches (SW) and ground.

6. The switchable capacitive element (SKE) according to claim 4, wherein the values C, $R_{MIM}$, $R_{ON}$, $R_G$, $R_{GS}$, $R_{GD}$, $R_D$, $r_{DS}$, $C_{GD}$, $C_{GS}$ and $C_{DS}$ are chosen such that the ratio $$\frac{Q}{C_{GD} + C_{GS} + C_{DS}}$$

comprising the quality factor Q and the sum of the intrinsic capacitances $C_{GD}$, $C_{GS}$ and $C_{DS}$ is at a maximum.

7. A switchable capacitance bank (SKB) having m switchable capacitive elements (SKE), wherein each of the switchable capacitive elements (SKE) comprises n parallel-connected paths (PF) with a respective capacitor (K) of capacitance $a^m * C$ and per path (PF) n semiconductor switches (SW), cascaded in the path (PF), with a respective source connection (S), gate connection (G) and drain connection (D), wherein the capacitors (K) of each path (PF) are connected between the cascade of the semiconductor switches (SW) and ground, the switchable capacitive element (SKE) has a frequency-dependent quality factor $Q_{on}(\omega)$ when the semiconductor switches (SW) are open and has a frequency-dependent quality factor $Q_{off}(\omega)$ when the semiconductor switches (SW) are closed, $R_G$ is the nonreactive resistance of a resistive element connected to the gate connection (G), $R_{GS}$ is the nonreactive resistance between the gate connection (G) and the source connection (S), $R_{GD}$ is the nonreactive resistance between the gate connection (G) and the drain connection (D), $R_D$ is the nonreactive resistance of a resistive element connected between the drain connection (D) and the source connection (S), $r_{DS}$ is the nonreactive resistance between the drain connection (D) and the source connection (S), $C_{GD}$ is the capacitance between the gate connection (G) and the drain connection (D), $C_{GS}$ is the capacitance between the gate connection (G) and the source connection (S), $C_{DS}$ is the capacitance between the drain connection (D) and the source connection (S), wherein the values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q_{ON} = \frac{1}{\omega \cdot \left(\frac{1}{a} R_{MIM} + \frac{n \cdot \frac{1}{a} R_{ON} \cdot \frac{1}{a} \cdot R_a}{n \cdot \frac{1}{a} R_{ON} + \frac{1}{a} R_a}\right) \cdot a \cdot C}$$

when the semiconductor switches (SW) are open and according to the equation $$Q_{OFF} = \frac{1}{\omega \cdot \left(\frac{1}{a} R_{MIM} + n \frac{1}{a} R_d + \frac{n}{\omega^2 a^2 C_d^2 \frac{1}{a} R_e} + \frac{n^3}{\omega^2 a^2 C_d^2 \frac{1}{a} R_a}\right) \cdot \frac{aC_d \cdot a \cdot C}{aC_d + n \cdot a^2 C}}$$

when the semiconductor switches (SW) are closed, wherein $$R_a = R_G \cdot \frac{C_{GD} + C_{GS}}{C_{GD}}$$

$$R_b = R_G \cdot \frac{C_{GD} + C_{GS}}{C_{GS}}$$

$$R_d = \frac{R_c}{\left(1 + \frac{C_{DS}}{C_c}\right)^2}$$

$$C_d = C_{DS} + C_c$$

$$R_e = \frac{r_{DS} R_D}{r_{DS} + R_D}$$

-continued $$R_c = \frac{R_{GD}}{1+(\omega R_{GD}C_{GD})^2} + \frac{R_{GS}}{1+(\omega R_{GS}C_{GS})^2} - \frac{1}{\omega^2 R_G C_{GD} C_{GS}}$$

$$C_c = \frac{C_{GD}C_{GS}}{C_{GD}+C_{GS}}$$

and n is a natural number $\geq 1$, m is an integer $\geq 0$ and $< n$ and a is a real number $>1$.

8. The switchable capacitance bank (SKB) according to claim 7, wherein the values C, $R_{MIM}$, $R_{ON}$, $R_G$, $R_{GS}$, $R_{GD}$, $R_D$, $r_{DS}$, $C_{GS}$, $C_{GS}$ and $C_{DS}$ are chosen such that the ratio $$\frac{Q}{C_{GD}+C_{GS}+C_{DS}}$$

comprising the quality factor Q and the sum of the intrinsic capacitances $C_{GD}$, $C_{GS}$ and $C_{DS}$ is at a maximum.

9. A method for producing adjustable capacitive elements or capacitance banks arranged in n parallel-connected paths with a respective capacitor having a capacitance $a^m*C$, where a is a real or natural number greater than one and m is an integer number greater than or equal to zero and less than n, each path including a semiconductor switch cascaded in the path with a respective source connection (S), gate connection (G), and drain connection (D), the method comprising:

predetermining a target quality factor for the element or the bank;

ascertaining the magnitude of the capacitances of the capacitors of the paths; and optimizing the target quality factor according to a function that includes a resistance $R_a$ whose value is calculated from a nonreactive resistance $R_G$ of an external resistive element connected to the gate connection (G), a gate-drain capacitance $C_{GD}$ between the gate connection and the drain connection, and a gate-source capacitance $C_{GS}$ between the gate connection and the source connection.

10. The method of claim 9, wherein the switchable capacitive element (SKE) has a frequency-dependent quality factor $Q^S_{on}(\omega)$ when the semiconductor switches (SW) are open and has a frequency-dependent quality factor $Q^S_{off}(\omega)$ when the semiconductor switches (SW) are closed, $R_G$ is the nonreactive resistance of a resistive element connected to the gate connection, $R_{GS}$ is the nonreactive resistance between the gate connection (G) and the source connection (S), $R_{GD}$ is the nonreactive resistance between the gate connection (G) and the drain connection (D), $R_D$ is the nonreactive resistance of a capacitive element connected between the drain connection (D) and the source connection (S), $r_{DS}$ is the nonreactive resistance between the drain connection (D) and the source connection (S), $C_{GD}$ is the capacitance between the gate connection (G) and the drain connection (D), $C_{GS}$ is the capacitance between the gate connection (G) and the source connection (S), $C_{DS}$ is the capacitance between the drain connection (D) and the source connection (S), wherein the values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q^S_{ON} = \frac{1}{\omega \cdot \left(R_{MIM} + \frac{n \cdot R_{ON} R_a}{n \cdot R_{ON} + R_a}\right) \cdot C}$$

when the semiconductor switches (SW) are open and according to the equation $$Q^S_{OFF} = \frac{1}{\omega \cdot \left(R_{MIM} + nR_d + \frac{n}{\omega^2 C_d^2 R_e} + \frac{n^3}{\omega^2 C_d^2 R_a}\right) \cdot \frac{C_d C}{C_d + nC}}$$

when the semiconductor switches (SW) are closed, wherein $$R_a = R_G \cdot \frac{C_{GD}+C_{GS}}{C_{GD}}$$

$$R_d = \frac{R_c}{\left(1+\frac{C_{DS}}{C_c}\right)^2}$$

$$C_d = C_{DS} + C_c$$

$$R_e = \frac{r_{DS}R_D}{r_{DS}+R_D}$$

$$R_c = \frac{R_{GD}}{1+(\omega R_{GD}C_{GD})^2} + \frac{R_{GS}}{1+(\omega R_{GS}C_{GS})^2} - \frac{1}{\omega^2 R_G C_{GD} C_{GS}}$$

$$C_c = \frac{C_{GD}C_{GS}}{C_{GD}+C_{GS}}$$

and n is a natural number $\geq 1$.

11. The method of claim 9, wherein the cascade of the semiconductor switches (SW) in each path (PF) is connected between the capacitor (K) of the path (PF) and ground.

12. The method of claim 9, wherein the values C, $R_{MIM}$, $R_{ON}$, $R_G$, $R_{GS}$, $R_{GD}$, $R_D$, $r_{DS}$, $C_{GD}$, $C_{GS}$ and $C_{DS}$ are chosen such that the ratio $$\frac{Q}{C_{GD}+C_{GS}+C_{DS}}$$

comprising the quality factor Q and the sum of the intrinsic capacitances $C_{GD}$, $C_{GS}$ and $C_{DS}$ is at a maximum.

13. The method of claim 9, wherein the switchable capacitive element (SKE) has a frequency-dependent quality factor $Q^D_{on}(\omega)$ when the semiconductor switches (SW) are open and has a frequency-dependent quality factor $Q^D_{off}(\omega)$ when the semiconductor switches (SW) are closed, $R_G$ is the nonreactive resistance of a resistive element connected to the gate connection (G), $R_{GS}$ is the nonreactive resistance between the gate connection (G) and the source connection (S), $R_{GD}$ is the nonreactive resistance between the gate connection (G) and the drain connection (D), $R_D$ is the nonreactive resistance of a resistive element connected between the drain connection (D) and the source connection (S), $r_{DS}$ is the nonreactive resistance of the switch between the drain connection (D) and the source connection (S), $C_{GD}$ is the capacitance between the gate connection (G) and the drain connection (D), $C_{GS}$ is the capacitance between the gate connection (G) and the source connection (S), $C_{DS}$ is the capacitance between the drain connection (D) and the source connection (S), wherein the values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q_{ON}^D = \frac{1}{\omega \cdot \left(R_{MIM} + nR_{ON} + \frac{n}{\omega^2 C^2 R_a} + \frac{n}{\omega^2 C^2 R_b}\right) \cdot C}$$

when the semiconductor switches (SW) are open and according to the equation $$Q_{OFF}^D = \frac{1}{\omega \cdot \left(R_{MIM} + nR_d + \frac{n}{\omega^2 C_d^2 R_e} + \frac{n}{\omega^2 C^2 R_a} + \frac{n}{\omega^2 \left(\frac{CC_d}{nC + C_d}\right)^2 R_b}\right) \cdot \frac{CC_d}{nC + C_d}}$$

when the semiconductor switches (SW) are closed, wherein $$R_a = R_G \cdot \frac{C_{GD} + C_{GS}}{C_{GD}}$$

$$R_b = R_G \cdot \frac{C_{GD} + C_{GS}}{C_{GS}}$$

$$R_d = \frac{R_c}{\left(1 + \frac{C_{DS}}{C_c}\right)^2}$$

$$C_d = C_{DS} + C_c$$

$$R_e = \frac{r_{DS} R_D}{r_{DS} + R_D}$$

$$R_c = \frac{R_{GD}}{1 + (\omega R_{GD} C_{GD})^2} + \frac{R_{GS}}{1 + (\omega R_{GS} C_{GS})^2} - \frac{1}{\omega^2 R_G C_{GD} C_{GS}}$$

$$C_c = \frac{C_{GD} C_{GS}}{C_{GD} + C_{GS}}$$

and n is a natural number $\geq 1$.

14. The method of claim 9, wherein the n parallel-connected paths (PF) have a respective capacitor (K) of capacitance $a^m * C$, and wherein the capacitors (K) of each path (PF) are connected between the cascade of the semiconductor switches (SW) and ground, the switchable capacitive element (SKE) has a frequency-dependent quality factor $Q_{on}(\omega)$ when the semiconductor switches (SW) are open and has a frequency-dependent quality factor $Q_{off}(\omega)$ when the semiconductor switches (SW) are closed, $R_G$ is the nonreactive resistance of a resistive element connected to the gate connection (G), $R_{GS}$ is the nonreactive resistance between the gate connection (G) and the source connection (S), $R_{GD}$ is the nonreactive resistance between the gate connection (G) and the drain connection (D), $R_D$ is the nonreactive resistance of a resistive element connected between the drain connection (D) and the source connection (S), $r_{DS}$ is the nonreactive resistance between the drain connection (D) and the source connection (S), $C_{GD}$ is the capacitance between the gate connection (G) and the drain connection (D), $C_{GS}$ is the capacitance between the gate connection (G) and the source connection (S), $C_{DS}$ is the capacitance between the drain connection (D) and the source connection (S), wherein the values C, $R_{MIM}$, $R_{ON}$, $R_G$, $R_{GS}$, $R_{GD}$, $R_D$, $r_{DS}$, $C_{GD}$, $C_{GS}$, $C_{DS}$ are optimized according to the equation $$Q_{ON} = \frac{1}{\omega \cdot \left(\frac{1}{a} R_{MIM} + \frac{n \cdot \frac{1}{a} R_{ON} \cdot \frac{1}{a} \cdot R_a}{n \cdot \frac{1}{a} R_{ON} + \frac{1}{a} R_a}\right) \cdot a \cdot C}$$

when the semiconductor switches (SW) are open and according to the equation $$Q_{OFF} = \frac{1}{\omega \cdot \left(\frac{1}{a} R_{MIM} + n \frac{1}{a} R_d + \frac{n}{\omega^2 a^2 C_d^2 \frac{1}{a} R_e} + \frac{n^3}{\omega^2 a^2 C_d^2 \frac{1}{a} R_a}\right) \cdot \frac{aC_d \cdot a \cdot C}{aC_d + n \cdot a^2 C}}$$

when the semiconductor switches (SW) are closed, wherein $$R_a = R_G \cdot \frac{C_{GD} + C_{GS}}{C_{GD}}$$

$$R_b = R_G \cdot \frac{C_{GD} + C_{GS}}{C_{GS}}$$

$$R_d = \frac{R_c}{\left(1 + \frac{C_{DS}}{C_c}\right)^2}$$

$$C_d = C_{DS} + C_c$$

$$R_e = \frac{r_{DS} R_D}{r_{DS} + R_D}$$

$$R_c = \frac{R_{GD}}{1 + (\omega R_{GD} C_{GD})^2} + \frac{R_{GS}}{1 + (\omega R_{GS} C_{GS})^2} - \frac{1}{\omega^2 R_G C_{GD} C_{GS}}$$

$$C_c = \frac{C_{GD} C_{GS}}{C_{GD} + C_{GS}}$$

and n is a natural number $\geq 1$, m is an integer $\geq 0$ and $<n$ and a is a real number $>1$.

* * * * *